United States Patent
Cron et al.

(10) Patent No.: US 10,246,617 B2
(45) Date of Patent: Apr. 2, 2019

(54) ADHESIVES WITH LOW VOC AND FOGGING VALUES

(71) Applicant: Evonik Degussa GmbH, Essen (DE)

(72) Inventors: Christina Cron, Velbert (DE); Gabriele Brenner, Dülmen (DE); Bernhard Schleimer, Marl (DE)

(73) Assignee: EVONIK DEGUSSA GMBH, Essen (DE)

( * ) Notice: Subject to any disclaimer, the term of this patent is extended or adjusted under 35 U.S.C. 154(b) by 0 days.

(21) Appl. No.: 15/548,009

(22) PCT Filed: Feb. 26, 2016

(86) PCT No.: PCT/EP2016/054096
§ 371 (c)(1),
(2) Date: Aug. 1, 2017

(87) PCT Pub. No.: WO2016/139146
PCT Pub. Date: Sep. 9, 2016

(65) Prior Publication Data
US 2018/0030320 A1    Feb. 1, 2018

(30) Foreign Application Priority Data
Mar. 2, 2015 (EP) ..................................... 15157141

(51) Int. Cl.
C09J 167/02 (2006.01)
C08G 63/16 (2006.01)
C08G 63/183 (2006.01)

(52) U.S. Cl.
CPC ............ *C09J 167/02* (2013.01); *C08G 63/16* (2013.01); *C08G 63/183* (2013.01); *C08G 2170/20* (2013.01)

(58) Field of Classification Search
CPC ....... C09J 167/02; C08G 63/16; C08G 63/183
See application file for complete search history.

(56) References Cited

U.S. PATENT DOCUMENTS

| | | | | |
|---|---|---|---|---|
| 4,363,853 A * | 12/1982 | Imamura | ............... | C08G 63/181 428/349 |
| 5,407,517 A * | 4/1995 | Hansel | .................... | C08G 18/10 156/331.4 |
| 5,712,230 A | 1/1998 | Abraham et al. | | |
| 5,712,320 A | 1/1998 | Green | | |
| 8,053,522 B2 | 11/2011 | Loehden et al. | | |
| 8,084,136 B2 | 12/2011 | Loehden et al. | | |
| 8,163,843 B2 * | 4/2012 | Brenner | ............... | C08G 63/183 156/241 |
| 8,383,728 B2 | 2/2013 | Brenner et al. | | |
| 8,702,899 B2 | 4/2014 | Spyrou et al. | | |
| 8,901,231 B2 | 12/2014 | Brand et al. | | |
| 2003/0018157 A1 * | 1/2003 | Kashima | ............ | C08G 18/4238 528/83 |
| 2004/0242765 A1 | 12/2004 | Munzmay et al. | | |
| 2007/0213465 A1 | 9/2007 | Brand et al. | | |
| 2010/0105831 A1 * | 4/2010 | Brenner | ................. | C08G 18/10 524/601 |
| 2011/0082252 A1 | 4/2011 | Koschabek et al. | | |
| 2013/0030075 A1 * | 1/2013 | Mecking | ................. | C07C 67/38 521/184 |
| 2014/0178812 A1 * | 6/2014 | Fukudome | ............ | C08G 63/16 430/109.4 |
| 2015/0247000 A1 * | 9/2015 | Moriyama | ............. | C08G 63/16 524/604 |
| 2015/0344620 A1 * | 12/2015 | Mody | ..................... | C08G 63/81 252/182.24 |
| 2016/0032045 A1 | 2/2016 | Diehl et al. | | |

FOREIGN PATENT DOCUMENTS

| | | |
|---|---|---|
| DE | 19528539 A1 | 2/1997 |
| DE | 19601410 A1 | 7/1997 |
| EP | 0448825 A2 | 10/1991 |
| EP | 1149850 A1 | 10/2001 |
| EP | 1481998 A2 | 12/2004 |
| EP | 1571171 A1 | 9/2005 |
| JP | 2004107457 | 4/2004 |
| WO | 2005090428 A1 | 9/2005 |
| WO | 2007098816 A1 | 9/2007 |
| WO | 2007098819 A1 | 9/2007 |
| WO | 2008090015 A1 | 7/2008 |
| WO | 2009010324 A1 | 1/2009 |
| WO | 2009021763 A1 | 2/2009 |
| WO | 2009095117 A1 | 8/2009 |
| WO | 2010006880 A1 | 1/2010 |
| WO | 2011073006 A1 | 6/2011 |
| WO | 2012125353 A1 | 9/2012 |
| WO | 2014139858 A1 | 9/2014 |
| WO | 2016034394 A1 | 3/2016 |
| WO | 2016124518 A1 | 8/2016 |
| WO | 2016139144 A1 | 9/2016 |
| WO | 2016139146 A1 | 9/2016 |
| WO | 2017001172 A1 | 1/2017 |

OTHER PUBLICATIONS

Brenner et al., U.S. Appl. No. 15/502,817, filed Feb. 9, 2017.
Cron et al., U.S. Appl. No. 15/541,752, filed Jul. 6, 2017.
German language International Search Report dated May 30, 2016 in PCT/EP2016/054096 (3 pages).
German language Written Opinion dated May 30, 2016 in PCT/EP2016/054096 (5 pages).
International Search Report dated May 30, 2016 in PCT/EP2016/054096 (2 pages).

* cited by examiner

*Primary Examiner* — Vu A Nguyen
(74) *Attorney, Agent, or Firm* — Philip P. McCann; Nexsen Pruet, PLLC

(57) ABSTRACT

The invention relates to hotmelt adhesives based on polyesters, having low VOC and fogging values. In particular, the invention is directed to a polyester based on polycarboxylic acids and di- or polyols, wherein the polyester including dicarboxylic acids of the formula HOOC—$(CH_2)_x$—COOH with $x>10$ and diols of the formula HO—$(CH_2)_y$—OH, with the proviso that at least 50 mole percent of the dicarboxylic acids, based on the total amount of polycarboxylic acid components, and at least 50 mole percent of the diols, based on the total amount of di- or polyols, satisfy the condition $x+y>18$, in hotmelt adhesives.

9 Claims, No Drawings

ADHESIVES WITH LOW VOC AND FOGGING VALUES

This application is a national stage application under 35 U.S.C. § 371 of International Application No. PCT/EP2016/054096 filed 26 Feb. 2016, which claims priority to EP Application No. 15157141.1 filed 2 Mar. 2015, the disclosures of which are expressly incorporated herein by reference.

FIELD

The invention relates to adhesives based on polyester polyols, having low VOC and fogging values.

BACKGROUND

Hotmelt adhesives are an important adhesive class for many applications, for example in the automotive sector, in the packaging sector, in furniture production or in textile bonding. They are solid at room temperature and are melted by heating, and are applied to the substrate in substance at elevated temperature. In the course of cooling, they solidify again and thus ensure a firm adhesive bond after only a short time.

A subgroup of the hotmelt adhesives is that of reactive hotmelt adhesives which, after application, additionally crosslink and thus cure irreversibly to form a thermoset. As compared with the non-crosslinking, purely physically curing thermoplastic hotmelt adhesives, the additional chemical curing leads to a higher stability of the adhesive bond. Reactive hotmelt adhesives are particularly suitable for bonds in the automotive and transport sector and the packaging sector, and in the construction industry, textile industry and the wood-processing industry.

A preferred example of reactive hotmelt adhesives is one-pack moisture-curing hotmelt adhesives. These are generally isocyanate-functionalized polymers obtainable by reacting polyols or polyol mixtures with an excess of polyisocyanates.

The polyols may be any desired polymer bearing hydroxyl groups. Examples of these include polycarbonate diols, hydroxyl-terminated polybutadienes, polyethers or polyhydroxyacrylates or polyhydroxymethacrylates. Particular preference is given to polyester polyols. These can be prepared, for example, via the ring-opening polymerization of lactones and preferably via the solvent-free melt condensation of polyols with polycarboxylic acids or derivatives thereof. Preference is given to linear bifunctional polyester polyols formed from diols and dicarboxylic acids, diesters and/or dianhydrides. Reactive hotmelt adhesives based on polyester polyols exhibit good adhesion to a multitude of substrates, since the ester groups can bind to the substrate surface via hydrogen bonds. In addition, it is possible to adjust the polymer properties and hence also the adhesive properties over a wide range via the nature and ratio of the comonomers.

In the production of the aforementioned systems, it should be ensured that the polymers obtained have minimum VOC values. VOC or VOCs (volatile organic compound(s)) is the collective term for organic, i.e. carbon-containing, substances which evaporate readily and are therefore volatile.

A disadvantage is that several side reactions can occur in the course of melt condensation of diols with dicarboxylic acids, diesters and/or dianhydrides. One of these is the formation of cyclic dimers by ring closure of a diol molecule with a dicarboxylic acid derivative. The cyclic dimers form via an equilibrium reaction from linear dimers, which form in turn by transesterification reactions at the chain ends of the linear polyester chains (cf. EP 1571171). This means that a proportion of cyclic dimers is always present as well as the linear polyester. Depending on the size and stability of the ring, the typical proportion is up to 1% by weight (cf. U.S. Pat. No. 5,712,320).

The volatility of the cycles depends on the ring size and hence depends on the nature of the monomer units used. For example, adipic acid and diethylene glycol form a cyclic diethylene glycol adipate composed of a total of 13 ring atoms which sublimes readily (cf. U.S. Pat. No. 5,712,320). Since the cyclic dimers do not have any hydroxyl functionality, they do not react with isocyanate groups and are not incorporated into the polyurethane network. The cycles can therefore evaporate off or migrate out of the cured adhesive. This is problematic particularly in the case of bonds in motor vehicle interiors and in the food packaging sector. In the case of food packaging, the volatile constituents can migrate into the food and alter the taste or damage the food in such a way as to constitute a health concern. In the automotive sector, the volatile constituents accumulate in the breathable air within the passenger cell and can cause an unpleasant odour. These may be of concern to health. It is particularly critical when the outgassing substances are deposited on cold surfaces such as the windscreen and lead to visual impairment. This effect is generally referred to as "fogging".

For the reasons mentioned above, for applications in the automotive interior sector, there is a demand for components and adhesives, sealants and coatings materials having low VOC and fogging values, which are generally measured by the industrial standard VDA 278. The standard defines the test conditions for determination of the emission values at particular temperatures. According to the limits required for cured adhesives and sealants of defined layer thickness, the VOC value, which is the proportion of volatile organic substances emitted as gases at 90° C. within 30 minutes, must not exceed 100 µg/g. In addition, what is called the FOG value, which is a measure of the amount of organic emissions at 120° C. within 30 minutes, must not be higher than 250 µg/g.

The literature, for example patent applications DE 19528539 and DE 19601410, JP 2004107457 and EP 1481998, describes various attempts to remove volatile cycles by distillation at elevated temperatures and under reduced pressure. If, for example, a polyester melt, after the condensation, is cooled down rapidly to temperatures below the softening point, it is possible to reduce the proportion of cyclic components. However, as soon as the polyester is melted again, the concentration of dimeric cycles rises again, since the cyclic components reform as a result of the equilibrium reaction.

Cured polyurethane hotmelt adhesives based on amorphous solid or liquid polyester polyol mixtures in particular combinations satisfy the limits of the automotive industry according to VDA 278. In contrast, cured formulations which, in addition to amorphous polyester polyols, comprise solid, crystalline or semicrystalline polyester polyols that are customary on the market have excessively high VOC and FOG values and do not satisfy the limits according to VDA 278. The reason is that the monomer units used customarily for the synthesis of crystalline polyesters form dimeric cycles which are volatile in the range relevant for VDA 278. These include, in particular, the dimers formed from aliphatic diols and dicarboxylic acids, for example cyclic neopentyl glycol adipate, butanediol adipate, hexanediol adipate, hexanediol sebacate, etc.

U.S. Pat. No. 5,712,230, for example, claims low-emission polyester polyurethane foams in which polyesters wherein the monomers cannot form any cycles having ring sizes between 12 and 14 atoms are used.

WO 2012125353 claims polyester polyols based on phthalic anhydride and selected diol units, for example ethylene glycol, propylene glycol, neopentyl glycol or hexanediol. The polyester polyols do have a low concentration of cyclic dimers, but the polymers are not crystalline.

SUMMARY

The problem addressed by the present invention was therefore that of providing adhesive or sealant formulations based on hotmelt adhesives, preferably on reactive hotmelt adhesives, which satisfy the same demands as the prior art formulations and have low VOC and FOG values and preferably meet the limits of the automotive industry according to standard VDA 278. Furthermore, the hotmelt adhesive formulation should also have a low cycle concentration on a permanent basis, i.e. even after storage of the systems used, for example in the melt. After curing, for example with diisocyanates, it is generally no longer possible for any dimeric cycles to form.

The aforementioned complex profile of requirements is achieved through use of specific polyesters according to the present invention in hotmelt adhesives.

DETAILED DESCRIPTION

The present invention accordingly first provides for the use of polyesters based on polycarboxylic acids and di- or polyols, comprising dicarboxylic acids of the formula HOOC—(CH2)x-COOH with x>10 and diols of the formula HO—(CH2)y-OH, with the proviso that at least 50 mole percent of the dicarboxylic acids, based on the total amount of polycarboxylic acid components, and at least 50 mole percent of the diols, based on the total amount of di- or polyols, satisfy the condition $x+y \geq 18$, in hotmelt adhesives.

It has been found that, surprisingly, the monomer combinations of the invention give solid, crystalline or semicrystalline polyester polyols having a melting point above room temperature, which have low VOC and FOG values in the reactive hotmelt adhesive after curing.

Suitable monomer combinations are long-chain linear α,ω-dicarboxylic acids in combination with linear aliphatic α,ω-diols, for example hexane-1,6-diol. Cyclic dimers formed from these monomers have a sufficiently high volatility because of their ring size.

The emission values measured according to VDA 278, even in the case of formulations containing exclusively the crystalline or semicrystalline polyesters according to the invention as polyols, are at lower measured values than conventional polyester polyols, for example hexanediol adipate. According to the invention, the VOC and FOG values are within the limits of VDA 278.

The polyesters used in accordance with the invention feature the obligatory proportion of long-chain linear α,ω-dicarboxylic acids of the formula HOOC—(CH2)x-COOH with x>10 and linear diols of the formula HO—(CH2)y-OH with $x+y \geq 18$.

In the dicarboxylic acids of the formula HOOC—(CH2)x-COOH and diols of the formula HO—(CH2)y-OH, x and y are each integers, especially x>10 and $y \geq 2$. In a preferred embodiment $x \geq 12$ and most preferably $x \geq 14$. In a preferred embodiment, $y \geq 6$, more preferably $y=6$.

Suitable dicarboxylic acids of the formula HOOC—(CH2)x-COOH are especially brassylic acid, tetradecanedicarboxylic acid, hexadecanedicarboxylic acid and octadecanedicarboxylic acid, particular preference being given to using tetradecanedicarboxylic acid and octadecanedicarboxylic acid.

The proportion of these dicarboxylic acids, based on the total proportion of polycarboxylic acids, is at least 50 mole percent, preferably at least 70 mole percent, based on the entirety of dicarboxylic acids used.

In addition, the polyester used in accordance with the invention may contain further di- or polycarboxylic acids. The remaining di- or polycarboxylic acids or derivatives thereof may be as desired. Examples of suitable di- and/or polycarboxylic acids and derivatives thereof are firstly aromatic compounds such as dimethyl terephthalate, terephthalic acid, isophthalic acid, naphthalenedicarboxylic acid and phthalic anhydride. Further examples are cyclic and linear aliphatic dicarboxylic acids such as cyclohexanedicarboxylic acid, hexahydrophthalic acid, succinic acid, glutaric acid, adipic acid, sebacic acid, azelaic acid and the diesters and anhydrides thereof. It is also possible to use polycarboxylic acids having more than two functional groups, for example trimellitic anhydride.

In the context of the present invention, di- or polycarboxylic acids are also understood to mean derivatives thereof, for example esters or anhydrides.

Suitable diols of the formula HOOC—(CH2)y-COOH are especially hexanediol, nonanediol, decanediol and dodecanediol, particular preference being given to using hexanediol and nonanediol.

The proportion of these diols, based on the total proportion of polyols, is at least 50 mole percent, preferably at least 70 mole percent.

In addition, the polyester used in accordance with the invention may contain further di- or polyols. Examples of suitable di- and/or polyols and derivatives thereof are aliphatic diols, for example monoethylene glycol, diethylene glycol, propane-1,3-diol, propane-1,2-diol, butane-1,4-diol, pentane-1,5-diol, methylpropanediol, dicidol, cyclohexanedimethanol, butylethylpentanediol, neopentyl glycol.

It is also possible to use polyols having more than two functional groups, for example trimethylolpropane, pentaerythritol or glycerol. Moreover, lactones and hydroxycarboxylic acids may be used as diols or polyols.

The polyesters described allow the provision of hotmelt adhesives having low VOC and FOG values, since any cyclic dimers which form from the components mentioned have a low tendency to volatility.

The polyesters are preferably synthesized via a melt condensation. For this purpose, the aforementioned di- and/or polycarboxylic acids and di- and/or polyols are initially charged and melted in an equivalents ratio of hydroxyl to carboxyl groups of 0.5 to 1.5, preferably 1.0 to 1.3. The polycondensation is effected in the melt at temperatures between 150 and 280° C. within 3 to 30 hours. First of all, a major part of the amount of water released is distilled off under atmospheric pressure. In the further course, the remaining water of reaction, and also volatile diols, are eliminated, until the target molecular weight is achieved. Optionally this may be made easier through reduced pressure, through an enlargement in the surface area, or by the passing of an inert gas stream through the reaction mixture. The reaction may additionally be accelerated by addition of an azeotrope former and/or of a catalyst before or during the reaction. Examples of suitable azeotrope formers are toluene and xylenes. Typical catalysts are organotitanium or organotin compounds such as tetrabutyl titanate or dibutyltin oxide. Also conceivable are catalysts based on other metals, such as zinc or antimony, for example, and also metal-free esterification catalysts. Also possible are further additives and process aids such as antioxidants or colour stabilizers.

The polyesters used in accordance with the invention have at least one hydroxyl and/or carboxyl end group, the functionality preferably being between 2.0 and 3.0.

The concentration of hydroxyl end groups, determined by titrimetric means to DIN 53240-2, is between 0 and 200 mg KOH/g, preferably between 5 and 50 mg KOH/g.

The concentration of acid end groups, determined to DIN EN ISO 2114, is between 0 and 50 mg KOH/g, but preferably below 2 mg KOH/g.

The number-average molecular weight of the polyesters used in accordance with the invention is 500-30 000 g/mol, preferably 1000-20 000 g/mol. It is determined to DIN 55672-1 by means of gel permeation chromatography in tetrahydrofuran as eluent and polystyrene for calibration.

The polyesters of the invention have one or more melting points. Preferably, at least one melting point is above room temperature, 23° C. The sum of the individual enthalpies of fusion in the first heating curve is 1-300 J/g, preferably 5-130 J/g.

In addition, the polyester of the invention may have a glass transition temperature in the range from −80° C. to 100° C., preferably between −60° C. and 0° C.

The thermal properties are determined by the DSC method to DIN 53765. For the determination of the melting points the first heating curve is consulted, and for the determination of the glass transition temperature the 2nd heating curve.

In the hotmelt adhesives of the invention, preference is given to using mixtures of different polyester polyols, since it is possible by means of a controlled mixture to establish a balanced profile of properties matched to the application. More particularly, amorphous, non-crystalline polyester polyols that are solid or liquid at room temperature are combined with solid, crystalline polyester polyols. The use of crystalline components can achieve, inter alia, rapid physical setting and hence high initial strength. High initial strengths allow rapid further processing of the bonded component and hence short cycle times. Therefore, a certain proportion of crystalline polyester polyols in the hotmelt adhesive formulation is required.

In a preferred embodiment of the present invention, the hotmelt adhesives are thermoplastic hotmelt adhesives which cure in a purely physical manner. In a further, particularly preferred embodiment of the present invention, the hotmelt adhesives are reactive hotmelt adhesives (reactive hotmelts, RHM), which additionally crosslink chemically, preference being given especially to moisture-curing hotmelt adhesives.

When employed in reactive hotmelt adhesives, the number-average molecular weight of the polyesters used in accordance with the invention is preferably 500-10 000 g/mol, more preferably 2000-8000 g/mol.

The proportion of the polyester of the invention in the formulation is, based on the overall formulation, 1-99 percent by weight, preferably 5-85 percent by weight and more preferably 10-70 percent by weight.

This assures a sufficient setting speed and, as a result of this, a sufficient handling strength of the reactive hotmelt immediately after the adhesive application.

In preferred embodiments, other polyols are also present in the hotmelt adhesives as well as the polyesters used in accordance with the invention, and these should be understood to mean, for example, polyester polyols, polyether polyols and any other hydroxyl-functional components. These polyols may be chosen as desired in principle. However, the polyols used should not significantly increase the VOC and FOG values of the formulation. Preferably, the VOC and FOG values of the individual polyols, based on the proportion thereof in the overall formulation, should not exceed the required limits according to VDA 278.

The polyester polyols added may be liquid or solid, amorphous or (semi)crystalline polyesters having molecular weights having a number average between 500 g/mol and 30 000 g/mol, preferably between 2000 g/mol and 10 000 g/mol (calculated from the hydroxyl number), preference being given to using linear polyester polyols. The polyether polyols added are polyether di- and triols. Examples of these are homo- and copolymers of ethylene glycol, propylene glycol and butane-1,4-diol. The molecular weight (number average) of the polyether polyols added should be within a range from 200 g/mol to 10 000 g/mol, preferably between 400 g/mol and 6000 g/mol. Examples of freely selectable hydroxyl-functional components are functionalized (H-acidic) thermoplastic polyurethanes (TPUs) or polyacrylates and/or ethylene-vinyl acetate copolymers (EVA).

The moisture-crosslinking hotmelt adhesives are obtained by the reaction of the polyol mixture with polyisocyanates. In the adhesives, the OH:NCO ratio of polyester to isocyanate is generally 1:1.2 to 1:3, preferably 1:1.5 to 1:2.5.

The polyisocyanates may be di- and/or multifunctional, aromatic, aliphatic and/or cycloaliphatic isocyanates, and carbodiimide-modified isocyanates or isocyanate-terminated prepolymers. Aromatic polyisocyanates are particularly preferred. Examples of polyisocyanates are diphenylmethane 4,4'-diisocyanate, diphenylmethane 2,4'-diisocyanate, toluene diisocyanate isomers, isophorone diisocyanate, hexamethylene diisocyanate, dicyclohexylmethane 4,4'-diisocyanate and mixtures thereof. They are especially diphenylmethane 4,4'-diisocyanate and mixtures of diphenylmethane 4,4'-diisocyanate and diphenylmethane 2,4'-diisocyanate.

Apart from the polyesters and polyisocyanates used in accordance with the invention, the adhesive formulation may contain up to 50 percent by weight, based on the overall formulation, of further additives which ensure improved hydrolysis stability, for example. Here too, it should be ensured that the VOC and fogging values of the overall formulation are not increased significantly.

These additions may be: nonfunctionalized polymers, for example thermoplastic polyurethanes (TPUs) and/or polyacrylates and/or ethylene-vinyl acetate copolymers (EVA); pigments or fillers, for example talc, silicon dioxide, titanium dioxide, barium sulphate, calcium carbonate, carbon black or colour pigments, tackifiers, for example rosins, hydrocarbon resins, phenol resins, and ageing stabilizers and auxiliaries.

In a preferred embodiment, the moisture-crosslinking hotmelt adhesives additionally contain organosilanes, as well as or in place of the polyisocyanates. The polyesters used in accordance with the invention can be functionalized by a stepwise reaction with polyisocyanates to give isocyanate-terminated prepolymers and subsequent reaction with organosilanes, or by reaction with an adduct formed from polyisocyanates and organosilanes.

In the simplest case, the polyesters are reacted with an isocyanatoalkylsilane in an OH/NCO ratio of 1:1 to 1:1.5.

Examples of organosilanes are aminopropyltrimethoxysilane, aminopropyltriethoxysilane, N-methylaminopropyltrimethoxysilane, N-cyclohexylaminopropyltrimethoxysilane, N-phenylaminopropyltrimethoxysilane, mercaptopropyltrimethoxysilane, mercaptotriethoxysilane.

Instead of polyester polyols, it is also possible to use polymers bearing cyclic carbonate groups. These can crosslink in the presence of amines likewise to give polyurethanes. It is also conceivable that the carbonate-terminated polymer is reacted with silanes bearing a nucleophilic group. The resulting silane-terminated polymers may likewise be converted in the presence of moisture. Preference is given to using aminosilanes.

In the simplest case, the hotmelt adhesive of the invention is produced by mixing the individual components in a stirred vessel with or without solvent, preferably in the melt. The melting temperature is guided by the viscosity of the constituents. It is typically within a range from 100 to 180° C.

The above-described moisture-curing hotmelt adhesives, depending on the viscosity of the respective formulation, can be applied at temperatures between 50 and 200° C., preferably between 80 and 150° C.

The present invention likewise provides hotmelt adhesives comprising polyesters based on polycarboxylic acids and di- or polyols, comprising dicarboxylic acids of the formula HOOC—(CH2)x-COOH with x>10 and diols of the formula HO—(CH2)y-OH, with the proviso that at least 50 mole percent of the dicarboxylic acids, based on the total amount of polycarboxylic acid components, and at least 50 mole percent of the diols, based on the total amount of di- or polyols, satisfy the condition x+y≥18.

The hotmelt adhesives of the invention are particularly suitable for production of adhesive bonds of a variety of substrates, especially for bonding of metallic substrates and textiles, and very particularly for bonding of various plastics. The nature and extent of the bonding are unlimited. Preferably, the bonds are bonds in the wood and furniture industry (for example assembly bonding and the lamination of decorative films onto fibreboard), in the automotive sector (for example laminations of films or textiles onto door side parts, inner roof linings, seat manufacture and retainer bonds), in the construction industry, shoe industry and textile industry, and in window construction (for example for profile ensheathing). In addition, the adhesives of the invention are suitable in the packaging industry, as sealants and as coating material.

The hotmelt adhesives of the invention are suitable for use either in one-pack or in two-pack systems.

In the case of the one-pack adhesives, the mixture is produced at a different time from the adhesive application, more particularly at a much earlier time. The application of the polyurethane adhesive of the invention is followed by curing, for example by thermally induced or moisture-induced reaction of the co-reactants present in the adhesive.

In the case of the two-pack adhesives, the mixture is produced directly prior to adhesive application. The drawback of two-pack application as compared with one-pack application is the increased level of technical complexity and greater proneness to error, for example in the mixing operation.

Even in the absence of further information it is assumed that a person skilled in the art can make very extensive use of the above description. The preferred embodiments and examples are therefore to be interpreted merely as descriptive disclosure, and certainly not as disclosure that is in any way limiting.

The present invention is explained in more detail below with reference to examples. Alternative embodiments of the present invention are obtainable analogously.

EXAMPLES

Example 1: Polyester P1 (Inventive)

3.57 kg of hexane-1,6-diol (30.3 mol) and 0.47 kg of monoethylene glycol (7.5 mol) are melted together with 1.98 kg of terephthalic acid (11.9 mol) and 5.62 kg of octadecanedioic acid (17.9 mol) in a flask with a distillation attachment under nitrogen. At a temperature of 240° C., the majority of the water of reaction formed is distilled off within about four to six hours. Subsequently, 1 g (0.01 percent by weight) of a titanium catalyst is added, the temperature is lowered to 230° C. and the pressure in the apparatus is lowered stepwise down to 10 mbar. The reaction has ended when no acid end groups are present any longer (acid number<1 mg KOH/g) and a concentration of hydroxyl end groups of 30 mg KOH/g has been attained. The polyester has a melting point of 72° C. with an enthalpy of fusion of 83 J/g.

Production of Moisture-Curing Hotmelt Adhesives (RHM)

RHM Example 1

In a 500 ml flange flask, 250 g of polyester P1 are melted and dried at 130° C. under reduced pressure. Thereafter, 37 g of diphenylmethane 4,4'-diisocyanate (MDI) are added, corresponding to an OH/NCO ratio of 1/2.2, and homogenized rapidly. For complete conversion of the co-reactants, the mixture is stirred under a protective gas atmosphere at 130° C. for 45 minutes. Subsequently, the moisture-curing hotmelt adhesive is dispensed.

Production of the Samples for the VDA 278 Measurement:

The RHM is melted and drawn down onto an aluminium carrier foil to give a thin film by means of bar applicator. The RHM film is cured in a climate-controlled cabinet at 205° C. and 65% relative air humidity for seven days and prepared for the measurement according to the specifications of VDA 278.

The adhesive has a VOC value of 15 μg/g and a FOG value of 93 μg/g, measured to VDA 278.

Example 2: Polyester 2 (Non-Inventive)

3.10 kg of sebacic acid (15.3 mol) are melted together with 1.99 kg of hexane-1,6-diol (16.9 mol) and 0.01 percent by weight of a titanium catalyst in a flask with a distillation attachment under nitrogen. At a temperature of 230° C., the majority of the water of reaction formed is distilled off within about four to six hours. Subsequently, the pressure in the apparatus is lowered stepwise down to 10 mbar. The reaction has ended when no acid end groups are present any longer (acid number<1 mg KOH/g) and a concentration of hydroxyl end groups of 30 mg KOH/g has been attained. The polyester has a melting point of 65° C. with an enthalpy of fusion of 110 J/g.

RHM Example RHM 2

RHM2 and the samples for the VOC/FOG measurement are produced analogously to Example RHM1 with polyester P2 rather than polyester P1.

The adhesive has a VOC value of 135 μg/g and a FOG value of >260 μg/g, measured to VDA 278.

Example 3: Polyester 3 (Non-Inventive)

4.00 kg of dodecanedioic acid (17.4 mol) are melted together with 1.2 kg of monoethylene glycol (19.4 mol) and 0.01 percent by weight of a titanium catalyst in a flask with a distillation attachment under nitrogen. At a temperature of 230° C., the majority of the water of reaction formed is distilled off within about four to six hours. Subsequently, the pressure in the apparatus is lowered stepwise down to 10 mbar. The reaction has ended when no acid end groups are present any longer (acid number<1 mg KOH/g) and a concentration of hydroxyl end groups of 30 mg KOH/g has been attained. The polyester has a melting point of 83° C. with an enthalpy of fusion of 73 J/g.

RHM Example RHM 3

RHM3 and the samples for the VOC/FOG measurement are produced analogously to Example RHM1 with polyester P3 rather than polyester P1.

The adhesive has a VOC value of 270 μg/g and a FOG value of 860 μg/g, measured to VDA 278.

Example 4: Polyester 4 (Non-Inventive)

3.2 kg of dodecanedioic acid (13.9 mol) are melted together with 1.8 kg of hexane-1,6-diol (15.3 mol) and 0.01 percent by weight of a titanium catalyst in a flask with a distillation attachment under nitrogen. At a temperature of 230° C., the majority of the water of reaction formed is distilled off within about four to six hours. Subsequently, the pressure in the apparatus is lowered stepwise down to 10 mbar. The reaction has ended when no acid end groups are present any longer (acid number<1 mg KOH/g) and a concentration of hydroxyl end groups of 30 mg KOH/g has been attained. The polyester has a melting point of 71° C. with an enthalpy of fusion of 126 J/g.

RHM Example RHM 4

RHM4 and the samples for the VOC/FOG measurement are produced analogously to Example RHM1 with polyester P4 rather than polyester P1.

The adhesive has a VOC value of 15 μg/g and a FOG value of 598 μg/g, measured to VDA 278.

The invention claimed is:

1. A hotmelt adhesive comprising polyesters based on polycarboxylic acids and di- or polyols, comprising dicarboxylic acids of the formula HOOC—$(CH_2)_x$-COOH with $x>10$ and diols of the formula HO—$(CH_2)_y$-OH, with the proviso that at least 50 mole percent of the dicarboxylic acids, based on the total amount of polycarboxylic acid components, and at least 50 mole percent of the diols, based on the total amount of di- or polyols, satisfy the condition $x+y \geq 18$.

2. The hotmelt adhesive according to claim 1, wherein the hotmelt adhesive are thermoplastic hotmelt adhesive.

3. The hotmelt adhesive according to claim 1, wherein the hotmelt adhesive are reactive hotmelt adhesive.

4. An article comprising the hotmelt adhesive according to claim 1.

5. The article bond according to claim 4, wherein the article is in the wood and furniture industry, in the automotive sector, in the construction industry, shoe industry and textile industry, or in window construction.

6. A sealant or a coating material comprising the hotmelt adhesive according to claim 1.

7. The article according to claim 4, wherein the hotmelt adhesive is used in one-pack or two-pack systems.

8. The sealant or a coating material according to claim 6, wherein the hotmelt adhesive is used in one-pack or two-pack systems.

9. The hotmelt adhesive according to claim 1, wherein $x>12$ and $y>6$.

* * * * *

UNITED STATES PATENT AND TRADEMARK OFFICE
CERTIFICATE OF CORRECTION

PATENT NO. : 10,246,617 B2
APPLICATION NO. : 15/548009
DATED : April 2, 2019
INVENTOR(S) : Christina Cron, Gabriele Brenner and Bernhard Schleimer Page 1 of 1

It is certified that error appears in the above-identified patent and that said Letters Patent is hereby corrected as shown below:

In the Claims

Column 10,
Line 21, "The article bond according to" should read -- The article according to --.

Signed and Sealed this
Twenty-first Day of May, 2019

Andrei Iancu
*Director of the United States Patent and Trademark Office*